United States Patent
Kuwayama et al.

(10) Patent No.: US 10,920,839 B2
(45) Date of Patent: Feb. 16, 2021

(54) DISC BRAKE ROTOR

(71) Applicant: SHIMANO INC., Sakai (JP)

(72) Inventors: Kazuya Kuwayama, Sakai (JP); Yusuke Hosomi, Sakai (JP)

(73) Assignee: SHIMANO INC., Sakai (JP)

( * ) Notice: Subject to any disclaimer, the term of this patent is extended or adjusted under 35 U.S.C. 154(b) by 159 days.

(21) Appl. No.: 16/015,138

(22) Filed: Jun. 21, 2018

(65) Prior Publication Data

US 2019/0390726 A1 Dec. 26, 2019

(51) Int. Cl.
*F16D 65/12* (2006.01)
*F16D 65/02* (2006.01)

(52) U.S. Cl.
CPC ......... *F16D 65/123* (2013.01); *F16D 65/125* (2013.01); *F16D 2065/1304* (2013.01); *F16D 2065/1324* (2013.01); *F16D 2065/1392* (2013.01)

(58) Field of Classification Search
CPC ........... F16D 65/123; F16D 2065/1392; F16D 65/125; F16D 65/127; F16D 65/128; F16D 2065/1304; F16D 2065/1324; B62L 5/06; B62L 5/14
See application file for complete search history.

(56) References Cited

U.S. PATENT DOCUMENTS

| | | | |
|---|---|---|---|
| 4,026,393 A | | 5/1977 | Gebhardt et al. |
| 9,752,633 B2 * | | 9/2017 | Nakakura ............. F16D 65/123 |
| 2004/0079612 A1 * | | 4/2004 | Endo .......................... B62J 6/12 |
| | | | 192/217 |
| 2012/0222926 A1 | | 9/2012 | Iwai et al. |
| 2015/0144441 A1 * | | 5/2015 | Kuo ....................... F16D 65/847 |
| | | | 188/218 XL |
| 2018/0201339 A1 | | 7/2018 | Shahana et al. |
| 2019/0032738 A1 * | | 1/2019 | Kuwayama ........... F16D 65/128 |
| 2019/0048952 A1 * | | 2/2019 | Kuwayama ............. F16D 65/12 |

FOREIGN PATENT DOCUMENTS

| | | |
|---|---|---|
| DE | 2510640 | 9/1976 |
| DE | 19706585 A1 * | 8/1998 |
| DE | 102004040357 | 2/2006 |
| DE | 102012004257 | 9/2012 |
| DE | 102018100514 | 7/2018 |
| JP | 2007-232090 | 9/2007 |
| WO | WO 2012/017096 | 2/2012 |

OTHER PUBLICATIONS

Translation of WO 2012/017096 description obtained from website: https://worldwide.espacenet.com on Mar. 9, 2020.*

* cited by examiner

*Primary Examiner* — Pamela Rodriguez
(74) *Attorney, Agent, or Firm* — Mori & Ward, LLP (57) ABSTRACT

A disc brake rotor comprises a hub engagement member, a friction member, a first member, and a second member. The hub engagement member is configured to engage with a hub assembly. The friction member is provided radially outwardly of the hub engagement member with respect to a rotational center axis of the disc brake rotor. The friction member has an axial thickness in an axial direction with respect to the rotational center axis. The first member extends between the hub engagement member and the friction member. The first member includes a recess that has an axial depth in the axial direction. The axial depth is larger than the axial thickness of the friction member. The second member is at least partly provided on the recess without using a screw connection.

21 Claims, 10 Drawing Sheets

DISC BRAKE ROTOR

BACKGROUND OF THE INVENTION

Field of the Invention

The present invention relates to a disc brake rotor.

Discussion of the Background

A conventional brake system includes a rotor and a brake caliper configured to apply a braking force to the rotor.

SUMMARY OF THE INVENTION

In accordance with a first aspect of the present invention, a disc brake rotor comprises a hub engagement member, a friction member, a first member, and a second member. The hub engagement member is configured to engage with a hub assembly. The friction member is provided radially outwardly of the hub engagement member with respect to a rotational center axis of the disc brake rotor. The friction member has an axial thickness in an axial direction with respect to the rotational center axis. The first member extends between the hub engagement member and the friction member. The first member includes a recess that has an axial depth in the axial direction. The axial depth is larger than the axial thickness of the friction member. The second member is at least partly provided on the recess without using a screw connection.

With the disc brake rotor according to the first aspect, it is possible to adjust mechanical characteristic of the disc brake rotor by changing a material of the second member. Furthermore, it is possible to simplify the structure of the disc brake rotor since the second member is at least partly provided on the recess without using the screw connection.

In accordance with a second aspect of the present invention, the disc brake rotor according to the first aspect is configured so that the hub engagement member includes a first axial end and a second axial end provided on a reverse side of the first axial end in the axial direction. The second member is at least partly provided in an axial range defined between the first axial end and the second axial end in the axial direction.

With the disc brake rotor according to the second aspect, it is possible to adjust mechanical characteristic of the disc brake rotor by changing a material of the second member. Furthermore, it is possible to make the disc brake rotor compact in the axial direction since the second member is at least partly provided in the axial range defined between the first axial end and the second axial end in the axial direction.

In accordance with a third aspect of the present invention, a disc brake rotor comprises a hub engagement member, a friction member, a first member, and a second member. The hub engagement member is configured to engage with a hub assembly. The friction member is provided radially outwardly of the hub engagement member with respect to a rotational center axis of the disc brake rotor. The first member extends between the hub engagement member and the friction member. The first member includes a recess that has an axial depth in an axial direction with respect to the rotational center axis. The first member has an axial dimension in the axial direction. The second member is at least partly provided on the recess within a range of the axial dimension of the first member.

With the disc brake rotor according to the third aspect, it is possible to adjust mechanical characteristic of the disc brake rotor by changing a material of the second member. Furthermore, it is possible to make the disc brake rotor compact in the axial direction since the second member is at least partly provided on the recess within a range of the axial dimension of the first member.

In accordance with a fourth aspect of the present invention, the disc brake rotor according to any one of the first to third aspects is configured so that the second member includes at least one of a non-metallic part and a magnet.

With the disc brake rotor according to the fourth aspect, it is possible to adjust rigidity of the disc brake rotor with the non-metallic part and/or it is possible to sense rotation of the disc brake rotor using the magnet.

In accordance with a fifth aspect of the present invention, a disc brake rotor comprises a hub engagement member, a friction member, a first member, and a second member. The hub engagement member is configured to engage with a hub assembly. The friction member is provided radially outwardly of the hub engagement member with respect to a rotational center axis of the disc brake rotor. The first member extends between the hub engagement member and the friction member. The first member includes a recess that has an axial depth in an axial direction with respect to the rotational center axis. The second member is at least partly provided on the recess. The second member includes at least one of a non-metallic part and a magnet.

With the disc brake rotor according to the fifth aspect, it is possible to adjust rigidity of the disc brake rotor with the non-metallic part and/or to sense rotation of the disc brake rotor using the magnet.

In accordance with a sixth aspect of the present invention, the disc brake rotor according to the fourth or fifth aspect is configured so that the non-metallic part is made of a resin material.

With the disc brake rotor according to the sixth aspect, it is possible to save weight of the disc brake rotor with adjusting mechanical characteristic of the disc brake rotor.

In accordance with a seventh aspect of the present invention, the disc brake rotor according to any one of the fourth to sixth aspects is configured so that the second member includes both the non-metallic part and the magnet.

With the disc brake rotor according to the seventh aspect, it is possible to adjust rigidity of the disc brake rotor with the non-metallic part and to sense rotation of the disc brake rotor using the magnet.

In accordance with an eighth aspect of the present invention, the disc brake rotor according to the seventh aspect is configured so that the non-metallic part is attached to the first member, and the magnet is attached to the first member with the non-metallic part.

With the disc brake rotor according to the eighth aspect, it is possible to certainly attach the non-metallic part and the magnet to the first member.

In accordance with a ninth aspect of the present invention, the disc brake rotor according to the seventh or eighth aspect is configured so that the magnet is at least partly provided in the non-metallic part.

With the disc brake rotor according to the ninth aspect, it is possible to certainly attach the magnet to the first member.

In accordance with a tenth aspect of the present invention, the disc brake rotor according to any one of the first to ninth aspects is configured so that the first member includes a through hole extending from a bottom of the recess, and the second member is at least partly arranged in the through hole.

With the disc brake rotor according to the tenth aspect, it is possible to improve connection strength between the first member and the second member.

In accordance with an eleventh aspect of the present invention, the disc brake rotor according to any one of the first to tenth aspects is configured so that the second member is detachable from the first member without substantial damage.

With the disc brake rotor according to the eleventh aspect, it is possible to improve maintenance of the disc brake rotor.

In accordance with a twelfth aspect of the present invention, the disc brake rotor according to any one of the first to tenth aspects is configured so that the second member is non-detachable from the first member without substantial damage.

With the disc brake rotor according to the twelfth aspect, it is possible to further improve connection strength between the first member and the second member.

In accordance with a thirteenth aspect of the present invention, the disc brake rotor according to any one of the first to twelfth aspects is configured so that the first member includes a plurality of arms extending between the hub engagement member and the friction member, the plurality of arms each has the recess, and the second member is provided on at least one of the plurality of arms.

With the disc brake rotor according to the thirteenth aspect, it is possible to effectively adjust mechanical characteristic of the disc brake rotor by providing the second member on the at least one of the plurality of arms.

In accordance with a fourteenth aspect of the present invention, the disc brake rotor according to the thirteenth aspect is configured so that the second member is provided on at least two of the plurality of arms.

With the disc brake rotor according to the fourteenth aspect, it is possible to effectively adjust mechanical characteristic of the disc brake rotor by selecting the arrangement of the second member.

In accordance with a fifteenth aspect of the present invention, the disc brake rotor according to the thirteenth or fourteenth aspect is configured so that at least one of the plurality of arms is free of the second member.

With the disc brake rotor according to the fifteenth aspect, it is possible to effectively adjust mechanical characteristic of the disc brake rotor by selecting the arrangement of the second member.

In accordance with a sixteenth aspect of the present invention, the disc brake rotor according to any one of the first to fifteenth aspects is configured so that the second member is provided between the hub engagement member and the friction member in a radial direction with respect to the rotational center axis.

With the disc brake rotor according to the sixteenth aspect, it is possible to utilize an area radially provided between the hub engagement member and the friction member as an area for the second member.

In accordance with a seventeenth aspect of the present invention, the disc brake rotor according to the sixteenth aspect is configured so that the recess of the first member has a radial dimension in the radial direction between the hub engagement member and the friction member, and the second member is at least partly provided within a range of the radial dimension.

With the disc brake rotor according to the seventeenth aspect, it is possible to utilize an area of the recess as an area for the second member.

In accordance with an eighteenth aspect of the present invention, the disc brake rotor according to any one of the first to seventeenth aspects is configured so that the first member is integrally provided with the hub engagement member as a one-piece unitary part.

With the disc brake rotor according to the eighteenth aspect, it is possible to reduce a manufacturing cost of the disc brake rotor.

In accordance with a nineteenth aspect of the present invention, the disc brake rotor according to any one of the first to eighteenth aspects is configured so that the hub engagement member includes an inner periphery having an inner serration to engage with an outer serration of the hub assembly.

With the disc brake rotor according to the nineteenth aspect, it is possible to easily couple the hub engagement member to the hub assembly with the inner serration and the outer serration.

In accordance with a twentieth aspect of the present invention, the disc brake rotor according to any one of the first to nineteenth aspects is configured so that the first member is made of a metallic material.

With the disc brake rotor according to the twentieth aspect, it is possible to maintain or improve rigidity of the first member with adjusting mechanical characteristic of the disc brake rotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

First Embodiment

Figure 1:
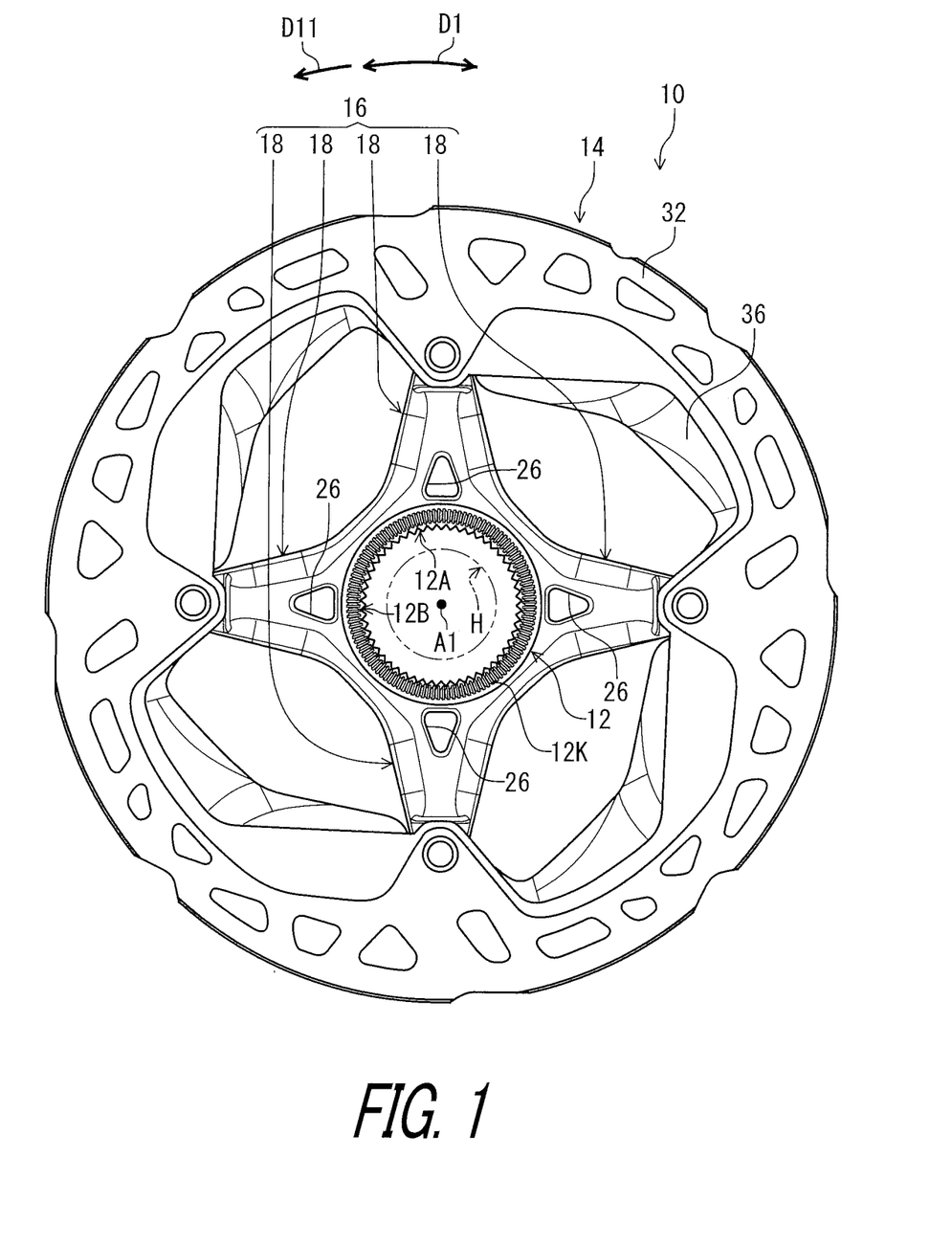
FIG. 1 is a side elevational view of a disc brake rotor in accordance with an embodiment.

Referring initially to FIG. 1, a disc brake rotor 10 in accordance with a first embodiment comprises a hub engagement member 12 and a friction member 14. The hub engagement member 12 is configured to engage with a hub assembly H. The friction member 14 is provided radially outwardly of the hub engagement member 12 with respect to a rotational center axis A1 of the disc brake rotor 10. The friction member 14 is coupled to the hub engagement member 12 to rotate along with the hub engagement member 12 about the rotational center axis A1.

The disc brake rotor 10 is rotatable relative to the rotational center axis A1 in a rotational direction D11 during pedaling. The rotational direction D11 is defined along a circumferential direction D1 of the disc brake rotor 10. The disc brake rotor 10 is used for a human-powered vehicle such as a bicycle. Thus, for example, the disc brake rotor 10 can also be referred to as a bicycle disc brake rotor 10.

The friction member 14 has an annular shape. The hub engagement member 12 has an annular shape. The hub engagement member 12 includes an inner periphery 12A having an inner serration 12B to engage with an outer serration of the hub assembly H. The hub engagement member 12 includes a knurled part 12K. The knurled part 12K is contactable with a lock member of the hub assembly H in a state where the disc brake rotor 10 is mounted on the hub assembly H. The knurled part 12K includes a plurality of projections circumferential arranged at a constant pitch. However, the structure of the hub engagement member 12 is not limited to this embodiment.

The disc brake rotor 10 comprises a first member 16. The first member 16 extends between the hub engagement member 12 and the friction member 14. The first member 16 includes a plurality of arms 18 extending between the hub engagement member 12 and the friction member 14. In this embodiment, the plurality of arm 18 extends radially outwardly from an outer periphery of the hub engagement member 12. The plurality of arms 18 is arranged at a constant pitch in the circumferential direction D1. However, the arrangement of the plurality of arms 18 is not limited to this embodiment. In this embodiment, the first member 16 includes four aims 18. In other words, the disc brake rotor 10 is constructed as a four-arms rotor. However, a total number of the arms 18 is not limited to this embodiment. The disc brake rotor 10 can be constructed as a five or more-arms rotor.

Figure 2:
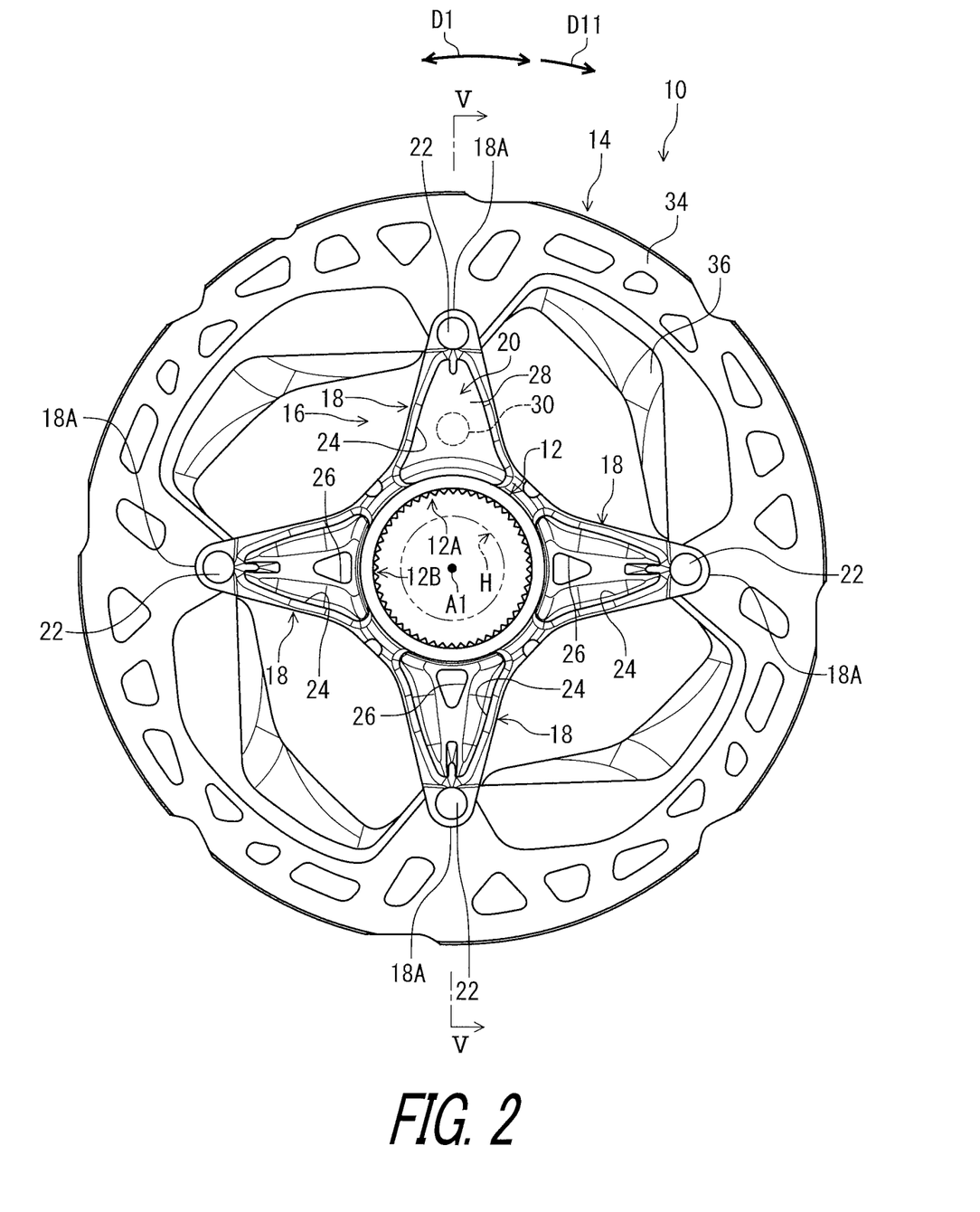
FIG. 2 is another side elevational view of the disc brake rotor illustrated in FIG. 1.

As seen in FIG. 2, the disc brake rotor 10 comprises a second member 20. The second member 20 is provided between the hub engagement member 12 and the friction member 14 in a radial direction with respect to the rotational center axis A1. In this embodiment, the arm 18 includes a radially outer end 18A coupled to the friction member 14. The radially outer end 18A is coupled to the friction member 14 with a fastener 22 such as a rivet. The second member 20 is provided between the hub engagement member 12 and the radially outer end 18A of the arm in the radial direction.

Figure 3:
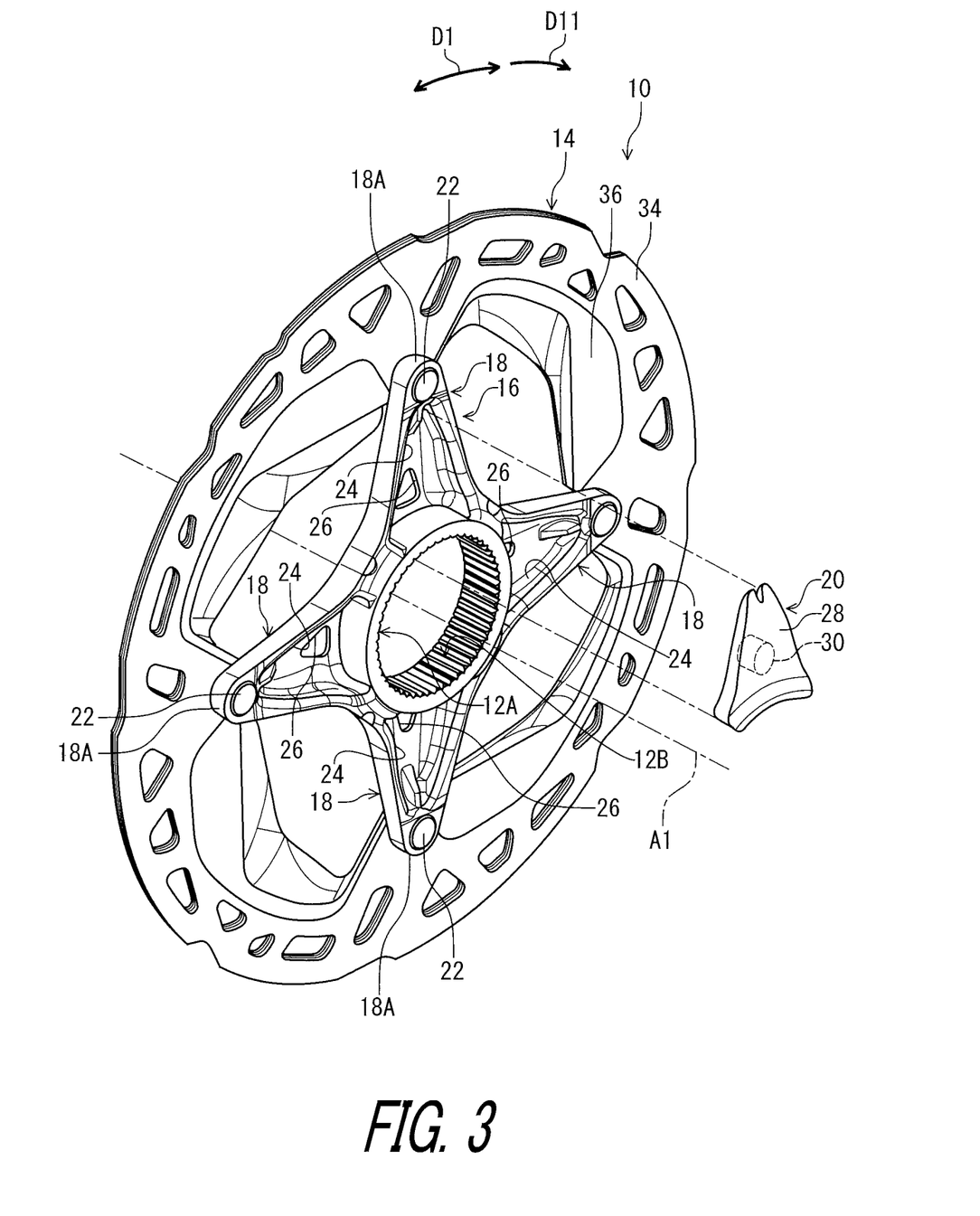
FIG. 3 is an exploded perspective view of the disc brake rotor illustrated in FIG. 1.
Figure 4:
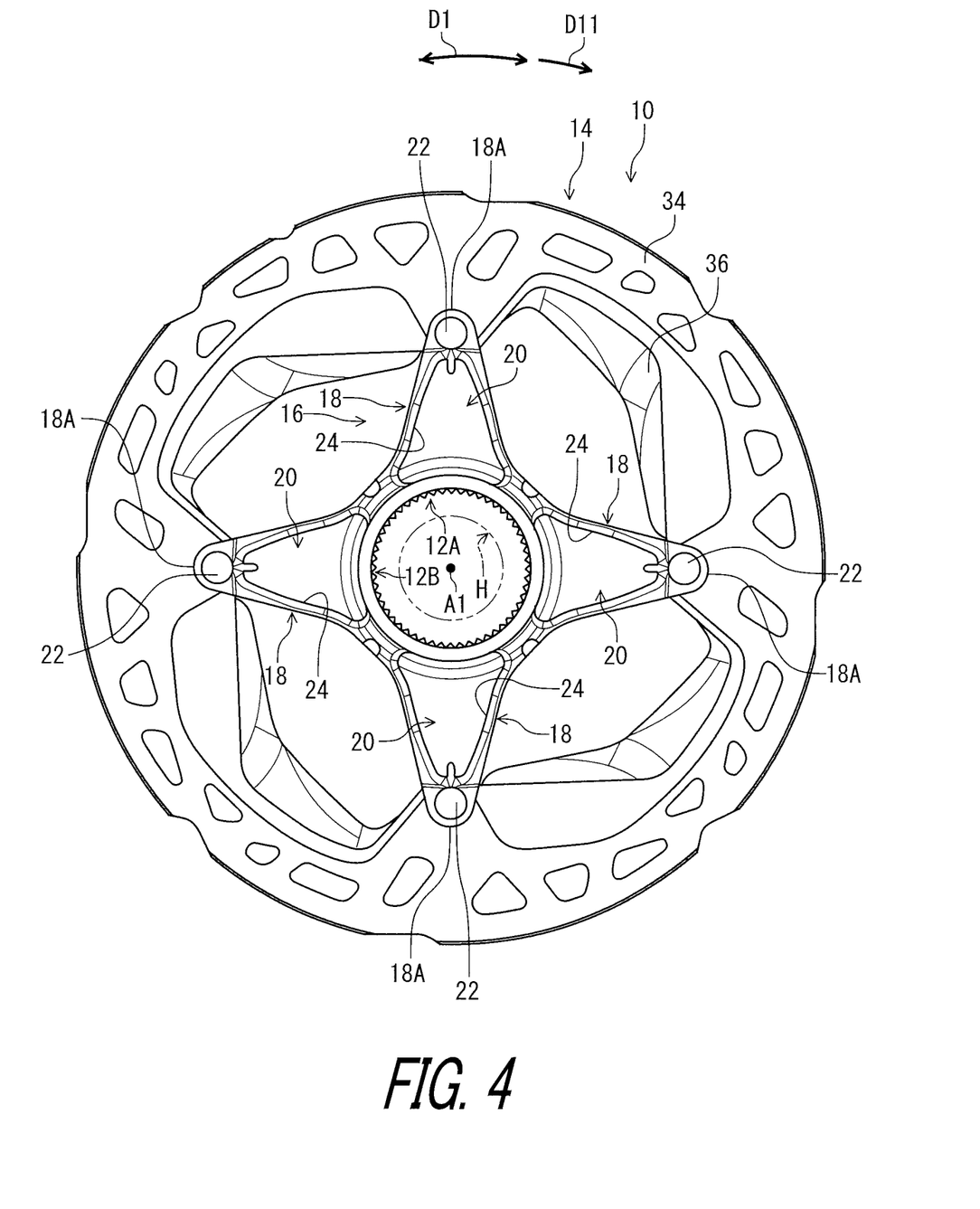
FIG. 4 is a side elevational view of a disc brake rotor in accordance with a modification.

As seen in FIG. 3, the first member 16 includes a recess 24. In this embodiment, the plurality of arms 18 each has the recess 24. The second member 20 is provided on at least one of the plurality of arms 18. At least one of the plurality of arms 18 is free of the second member 20. In this embodiment, the recess 24 is provided such that the second member 20 is in contact with an outer periphery of the hub engagement member 12. In other words, an inner periphery of the recess 24 is partly defined by the hub engagement member 12. In this embodiment, the second member 20 is provided on one of the plurality of arms 18. The remaining of the plurality of arms 18 is free of the second member 20. As seen in FIG. 4, however, the second member 20 can be provided on at least two of the plurality of arms 18. In FIG. 4, the second member is provided on each of the plurality of arms 18.

Figure 5:
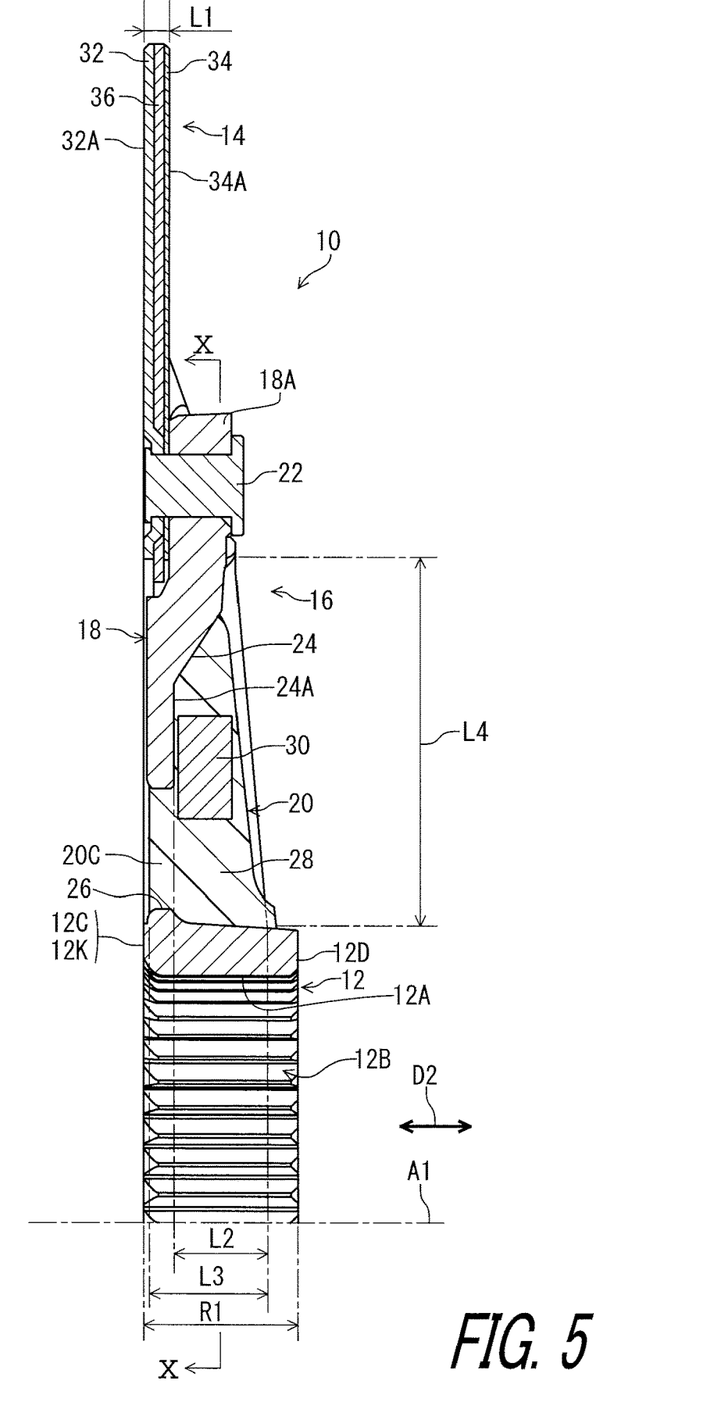
FIG. 5 is a partial cross-sectional view of the disc brake rotor taken along line V-V of FIG. 2.

As seen in FIG. 5, the second member 20 is at least partly provided on the recess 24. The second member 20 is at least partly provided on the recess 24 without using a screw connection. The screw connection includes a connection among a plurality of members with a screw. In this embodiment, the second member 20 is entirely provided on the recess 24 without using the screw connection. The second member 20 is secured to the first member 16 without using the screw connection. However, the second member 20 can be entirely provided on the recess 24 with the screw connection. The second member 20 can be secured to the first member 16 with a screw connection.

The first member 16 includes a through hole 26 extending from a bottom 24A of the recess 24. The second member 20 is at least partly arranged in the through hole 26. In this embodiment, the second member 20 is partly arranged in the through hole 26. However, the second member 20 can be entirely arranged in the through hole 26.

Figure 6:
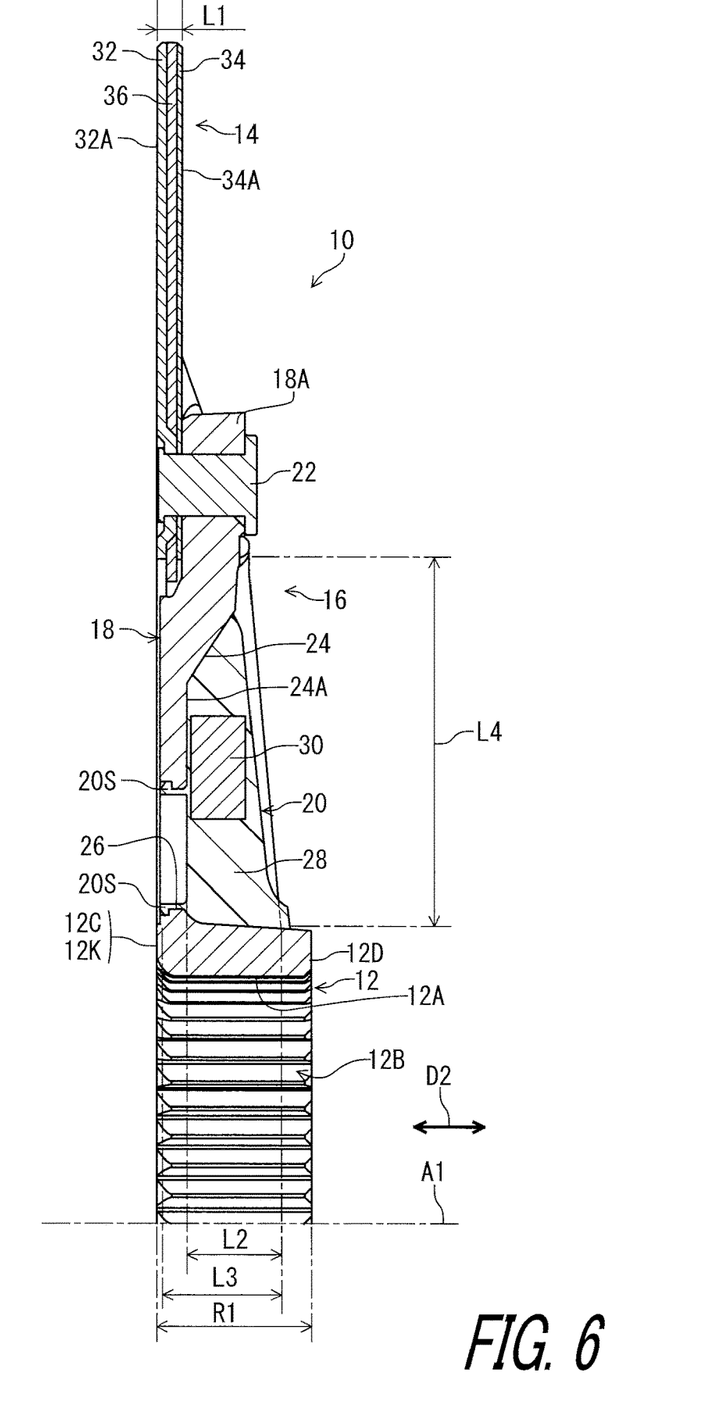
FIG. 6 is a partial cross-sectional view of a disc brake rotor in accordance with another modification.

In this embodiment, the second member 20 is non-detachable from the first member 16 without substantial damage. The second member 20 includes a coupling part 20C provided in the through hole 26. The coupling part 20C couples the second member 20 to the first member 16 to be non-detachable from the first member 16 without substantial damage. The coupling part 20C can be substantially damaged when the second member 20 is forcibly detached from the first member 16. As seen in FIG. 6, however, the second member 20 can be detachable from the first member 16 without substantial damage. In such modification, the second member 20 can be detachably attached to the first member 16 with snap-fits 20S.

Figure 7:
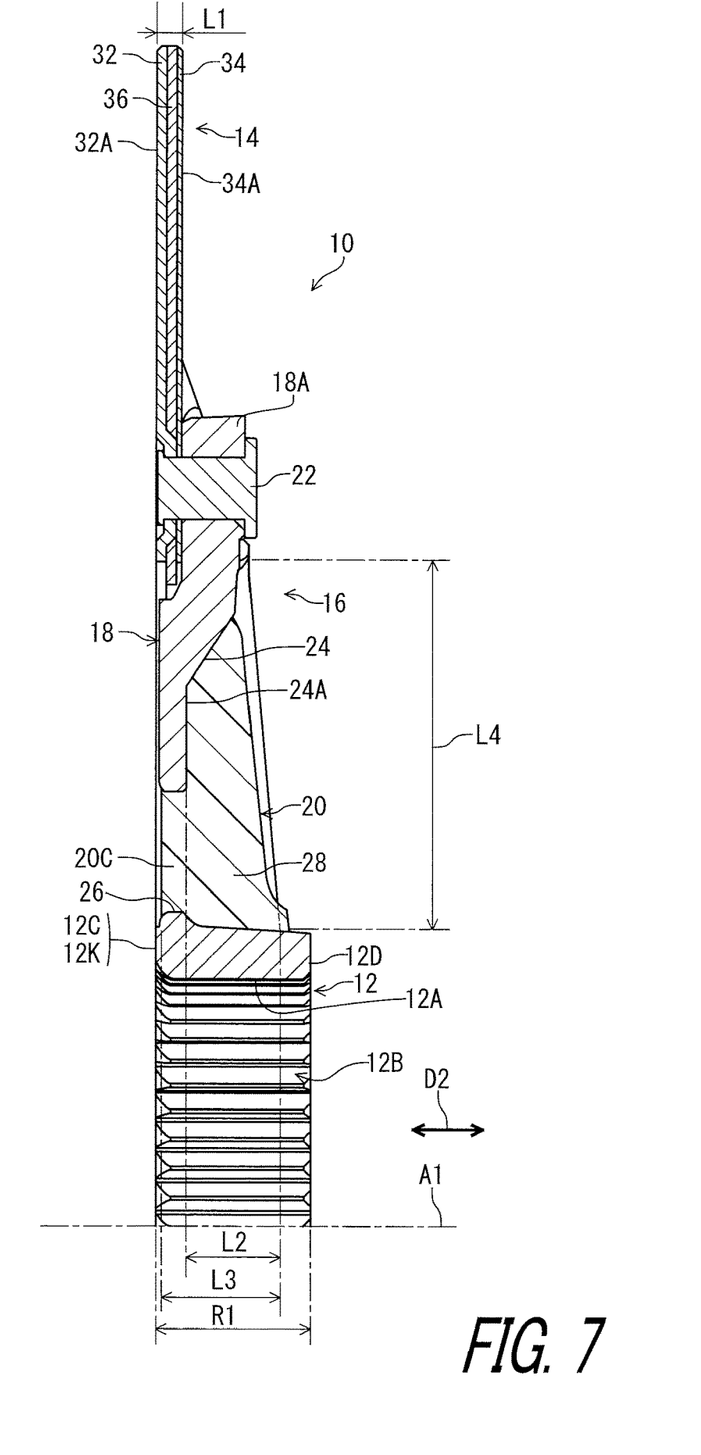
FIG. 7 is a partial cross-sectional view of a disc brake rotor in accordance with another modification.
Figure 8:
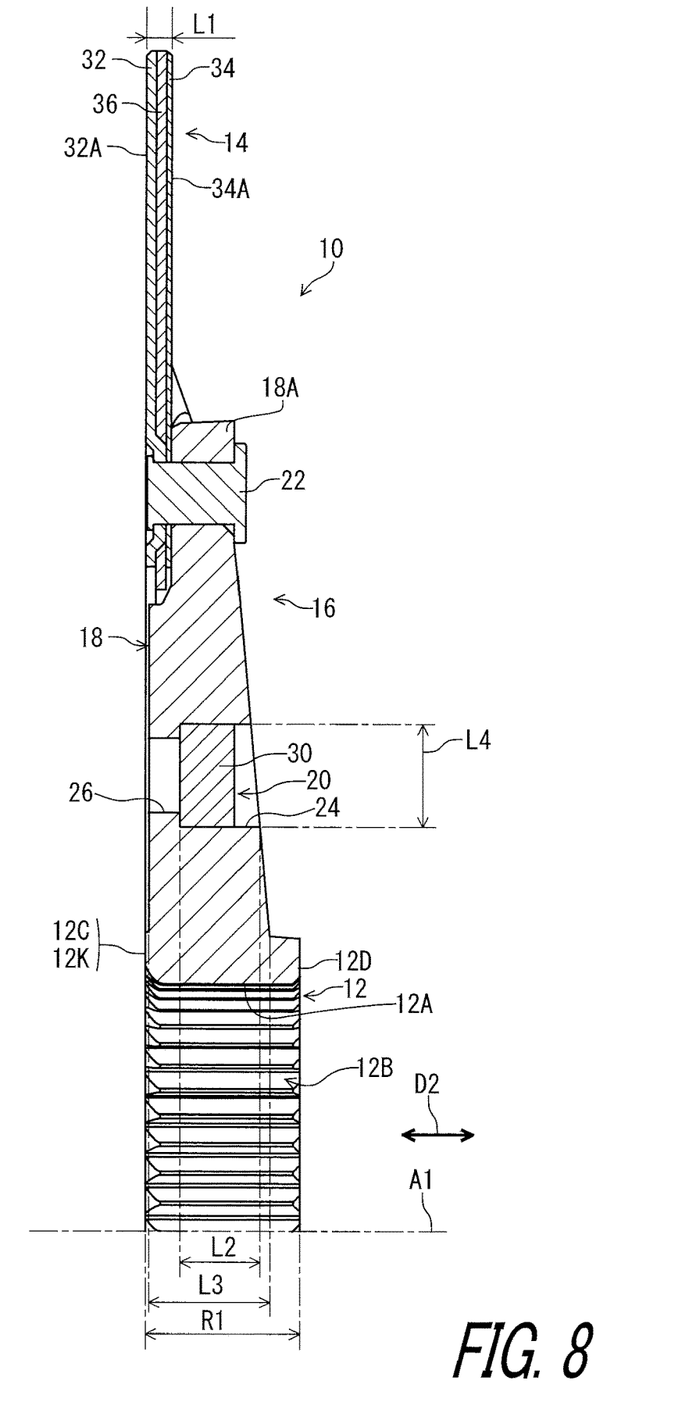
FIG. 8 is a partial cross-sectional view of a disc brake rotor in accordance with another modification.

As seen in FIG. 5, the second member 20 includes at least one of a non-metallic part 28 and a magnet 30. In this embodiment, the second member 20 includes both the non-metallic part 28 and the magnet 30. As seen in FIGS. 7 and 8, however, the second member 20 can include only one of a non-metallic part 28 and a magnet 30. The second member 20 can include another part instead of or in addition to the at least one of the non-metallic part 28 and the magnet 30. For example, the non-metallic part 28 is used to adjust rigidity of the disc brake rotor 10 and/or to attach the magnet 30 to the first member 16. The magnet 30 is used to sense rotation of the disc brake rotor 10.

The non-metallic part 28 is attached to the first member 16. The magnet 30 is attached to the first member 16 with the non-metallic part 28. The magnet 30 is at least partly provided in the non-metallic part 28. In this embodiment, the magnet 30 is entirely provided in the non-metallic part 28. However, the magnet 30 can be partly provided in the non-metallic part 28.

The first member 16 is made of a metallic material. In this embodiment, the first member 16 is made of an aluminum alloy or a magnesium alloy. The non-metallic part 28 is made of a resin material. The non-metallic part 28 is formed by casting a melted resin material to the recess 24 in a molding process (injection molding process) of the second member 20. The magnet 30 is at least partly embedded in the non-metallic part 28 in the molding process. Specifically, the magnet 30 is partly embedded in the non-metallic part 28 in the molding process. The non-metallic part 28 includes the coupling part 20C. The coupling part 20C is formed by casting the melted resin material to the through hole 26. However, the material of the non-metallic part 28 is not limited to this embodiment. The non-metallic part 28 can be formed with another process. The magnet 30 can be partly embedded in the non-metallic part 28. The first member 16 can be made of a non-metallic material.

The first member 16 is integrally provided with the hub engagement member 12 as a one-piece unitary part. Thus, the hub engagement member 12 is made of a metallic material. In this embodiment, the hub engagement member 12 is made of an aluminum alloy or a magnesium alloy. However, the first member 16 can be a separate member from the hub engagement member 12. The hub engagement member 12 can be made of a non-metallic material.

As seen in FIG. 5, the friction member 14 has an axial thickness L1 in an axial direction D2 with respect to the rotational center axis A1. The recess 24 has an axial depth L2 in the axial direction D2 with respect to the rotational center axis A1. The axial depth L2 is larger than the axial thickness L1 of the friction member 14. The axial depth L2 of the recess 24 is defined from the bottom 24A in the axial direction D2 as a maximum depth of the recess 24.

In this embodiment, the friction member 14 includes a first friction part 32, a second friction part 34, and an intermediate part 36. The first friction part 32 and the second friction part 34 are attached to the intermediate part 36 with a diffusion bonding process. The first friction part 32 includes a first friction surface 32A. The second friction part 34 includes a second friction surface 34A. The axial thickness L1 is defined between the first friction surface 32A and the second friction surface 34A in the axial direction D2. The friction member 14 is made of a metallic material. In this embodiment, the first friction part 32 and the second friction part 34 are made of a stainless steel. The intermediate part 36 is made of an aluminum alloy. The structure of the friction member 14 is not limited to this embodiment.

The hub engagement member 12 includes a first axial end 12C and a second axial end 12D provided on a reverse side of the first axial end 12C in the axial direction D2. The second member 20 is at least partly provided in an axial range R1 defined between the first axial end 12C and the second axial end 12D in the axial direction D2. In this embodiment, the second member 20 is entirely provided in the axial range R1. However, the second member 20 can be partly provided in the axial range R1. The first axial end 12C includes the knurled part 12K. The first axial end 12C is defined with a top portion of the knurled part 12K in the axial direction D2. Thus, the axial range R1 is defined between the knurled part 12K and the second axial end 12D. The axial range R1 is a maximum axial range defined by the hub engagement member 12 in the axial direction D2.

The first member 16 has an axial dimension L3 in the axial direction D2. The second member 20 is at least partly provided on the recess 24 within a range of the axial dimension L3 of the first member 16. In this embodiment, the second member 20 is entirely provided on the recess 24 and partly provided within the range of the axial dimension L3 of the first member 16. However, the second member 20 can be partly provided on the recess 24. The second member 20 can be entirely provided within the range of the axial dimension L3 of the first member 16.

The recess 24 of the first member 16 has a radial dimension L4 in the radial direction between the hub engagement member 12 and the friction member 14. The second member 20 is at least partly provided within a range of the radial dimension L4. In this embodiment, the second member 20 is entirely provided within the range of the radial dimension L4. However, the second member 20 can be partly provided within the range of the radial dimension L4.

Figure 9:
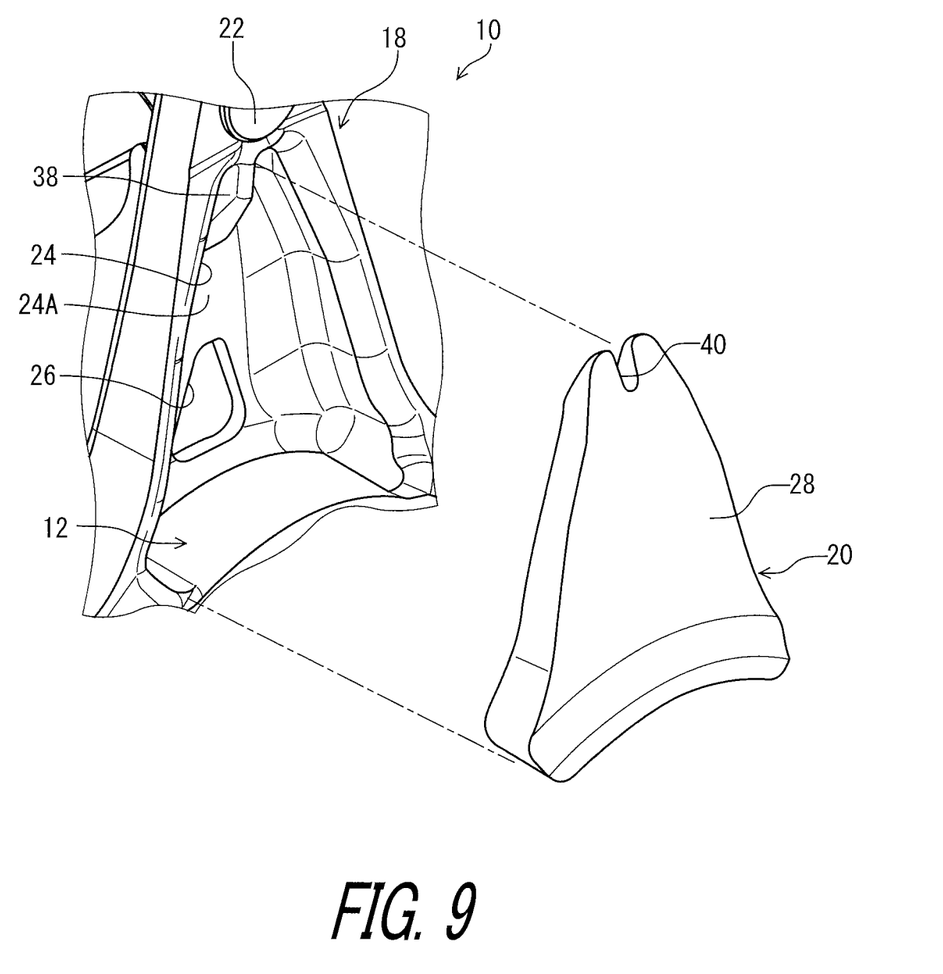
FIG. 9 is a partial exploded perspective view of the disc brake rotor illustrated in FIG. 1.
Figure 10:
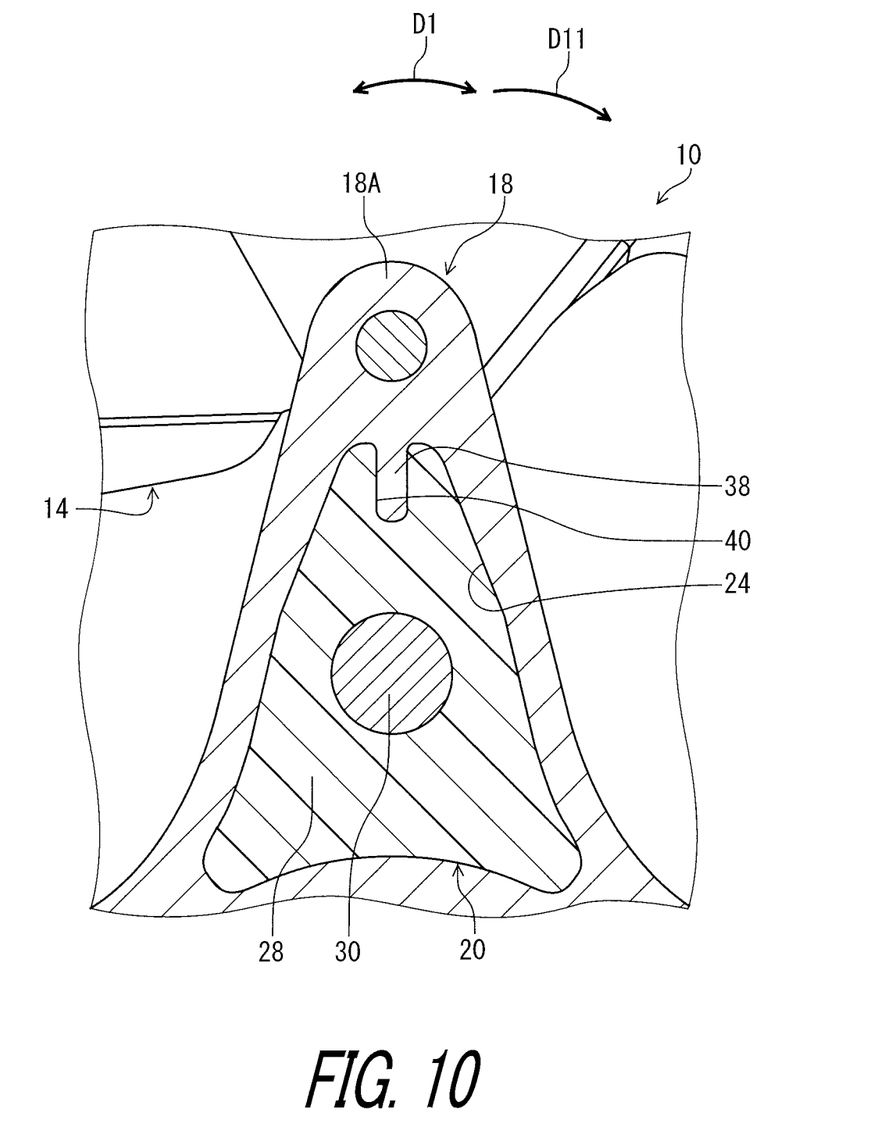
FIG. 10 is a partial cross-sectional view of the disc brake rotor taken along line X-X of FIG. 5.

As seen in FIG. 9, the arm 18 includes a projection 38 provided in the recess 24. The second member 20 includes a groove 40. As seen in FIG. 10, the projection 38 is provided in the groove 40 in a state where the second member 20 is provided on the recess 24. However, the arm 18 can be provided with a recess and the second member 20 can be provided with a projection corresponding to the recess of the arm 18.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake rotor comprising:
    a hub engagement member configured to engage with a hub assembly;
    a friction member provided radially outwardly of the hub engagement member with respect to a rotational center axis of the disc brake rotor, the friction member having an axial thickness in an axial direction with respect to the rotational center axis;
    a first member extending between the hub engagement member and the friction member, the first member including a recess that has an axial depth in the axial direction, the axial depth being larger than the axial thickness of the friction member; and
    a second member at least partly provided on the recess without using a screw connection, wherein
    the first member is a separate member with respect to the friction member,
    the first member being attached to the friction member by a fastening member, and
    the second member has a radially outermost edge that is radially inward of a radially innermost edge of the fastening member.

2. The disc brake rotor according to claim 1, wherein
    the hub engagement member includes a first axial end and a second axial end provided on a reverse side of the first axial end in the axial direction, and the second member is at least partly provided in an axial range defined between the first axial end and the second axial end in the axial direction.

3. The disc brake rotor according to claim 1, wherein the second member includes at least one of a non-metallic part and a magnet.

4. The disc brake rotor according to claim 3, wherein the non-metallic part is made of a resin material.

5. The disc brake rotor according to claim 3, wherein the second member includes both the non-metallic part and the magnet.

6. The disc brake rotor according to claim 5, wherein the non-metallic part is attached to the first member, and the magnet is attached to the first member with the non-metallic part.

7. The disc brake rotor according to claim 5, wherein the magnet is at least partly provided in the non-metallic part.

8. The disc brake rotor according to claim 1, wherein the first member includes a through hole extending from a bottom of the recess, and the second member is at least partly arranged in the through hole.

9. The disc brake rotor according to claim 1, wherein the second member is detachable from the first member without substantial damage.

10. The disc brake rotor according to claim 1, wherein the second member is non-detachable from the first member without substantial damage.

11. The disc brake rotor according to claim 1, wherein the first member includes a plurality of arms extending between the hub engagement member and the friction member, the plurality of arms each has the recess, and the second member is provided on at least one of the plurality of arms.

12. The disc brake rotor according to claim 11, wherein at least one of the plurality of arms is free of the second member.

13. The disc brake rotor according to claim 1, wherein the second member is provided on at least two of the plurality of arms.

14. The disc brake rotor according to claim 1, wherein the second member is provided between the hub engagement member and the friction member in a radial direction with respect to the rotational center axis.

15. The disc brake rotor according to claim 14, wherein the recess of the first member has a radial dimension in the radial direction between the hub engagement member and the friction member, and the second member is at least partly provided within a range of the radial dimension.

16. The disc brake rotor according to claim 1, wherein the first member is integrally provided with the hub engagement member as a one-piece unitary part.

17. The disc brake rotor according to claim 1, wherein the hub engagement member includes an inner periphery having an inner serration to engage with an outer serration of the hub assembly.

18. The disc brake rotor according to claim 1, wherein the first member is made of a metallic material.

19. The disc brake rotor according to claim 1, wherein the second member is offset from the friction member in a radial direction.

20. A disc brake rotor comprising:
a hub engagement member configured to engage with a hub assembly;
a friction member provided radially outwardly of the hub engagement member with respect to a rotational center axis of the disc brake rotor;
a first member extending between the hub engagement member and the friction member, the first member including a recess that has an axial depth in an axial direction with respect to the rotational center axis, the first member having an axial dimension in the axial direction; and
a second member at least partly provided on the recess within a range of the axial dimension of the first member, wherein
the first member is a separate member with respect to the friction member,
the first member being attached to the friction member by a fastening member, and
the second member has a radially outermost edge that is radially inward of a radially innermost edge of the fastening member.

21. A disc brake rotor comprising:
a hub engagement member configured to engage with a hub assembly;
a friction member provided radially outwardly of the hub engagement member with respect to a rotational center axis of the disc brake rotor;
a first member extending between the hub engagement member and the friction member, the first member including a recess that has an axial depth in an axial direction with respect to the rotational center axis; and
a second member at least partly provided on the recess, the second member including at least one of a non-metallic part and a magnet, wherein
the first member is a separate member with respect to the friction member,
the first member being attached to the friction member by a fastening member, and
the second member has a radially outermost edge that is radially inward of a radially innermost edge of the fastening member.

* * * * *